United States Patent [19]

Doty

[11] Patent Number: 4,705,230
[45] Date of Patent: Nov. 10, 1987

[54] HORIZONTAL RETRACTOR

[75] Inventor: Gerald A. Doty, Crown Point, Ind.

[73] Assignee: Gateway Industries, Inc., Olympia Fields, Ill.

[21] Appl. No.: 835,606

[22] Filed: Mar. 3, 1986

[51] Int. Cl.$^4$ ............................................. B60R 22/40
[52] U.S. Cl. ............................................. 242/107.4 A
[58] Field of Search ................. 242/107.4 A; 297/478; 280/806

[56] References Cited

U.S. PATENT DOCUMENTS

| 4,337,906 | 7/1982 | Colasanti et al. | 242/107.4 A |
| 4,605,180 | 8/1986 | Fisher | 242/107.4 A |

FOREIGN PATENT DOCUMENTS

| 0046308 | 2/1982 | European Pat. Off. | 242/107.4 A |
| 2070913 | 9/1981 | United Kingdom | 242/107.4 A |

Primary Examiner—John M. Jillions
Attorney, Agent, or Firm—Fitch, Even, Tabin & Flannery

[57] ABSTRACT

A horizontally-mounted retractor having a horizontally elongated frame with a horizontal reel rotatably mounted therein adjacent one end. The reel includes a pair of ratchet wheels thereon and carries a rolled safety belt. A locking bar pivotally mounted in the frame is movable along a horizontal path into engagement with the ratchet wheels on the reel to stop protraction of the belt from the reel. A subassembly to actuate the locking bar includes an inertia member, which has a portion displaced vertically upon deceleration, to shift a transfer member, which is pivotally mounted to transfer this vertical displacement into a horizontal travel displacement of a programmed pawl, pivotally mounted for movement into and out of engagement with a programmed ratchet mounted on a reel. The programmed ratchet further rotates the programmed pawl about its mounting and a portion of the programmed pawl engages the locking bar to pivot the same into locking engagement with the ratchet wheels.

9 Claims, 9 Drawing Figures

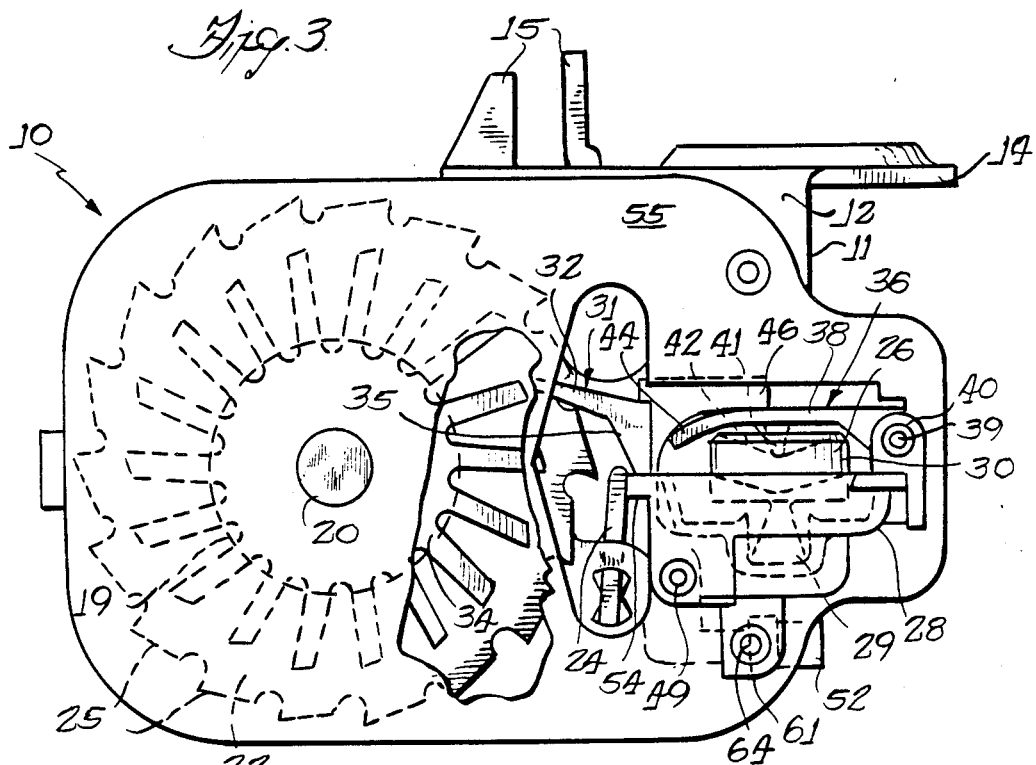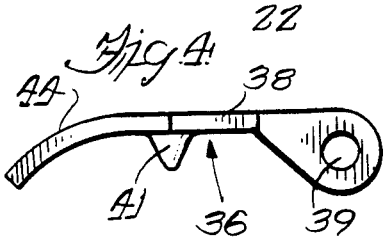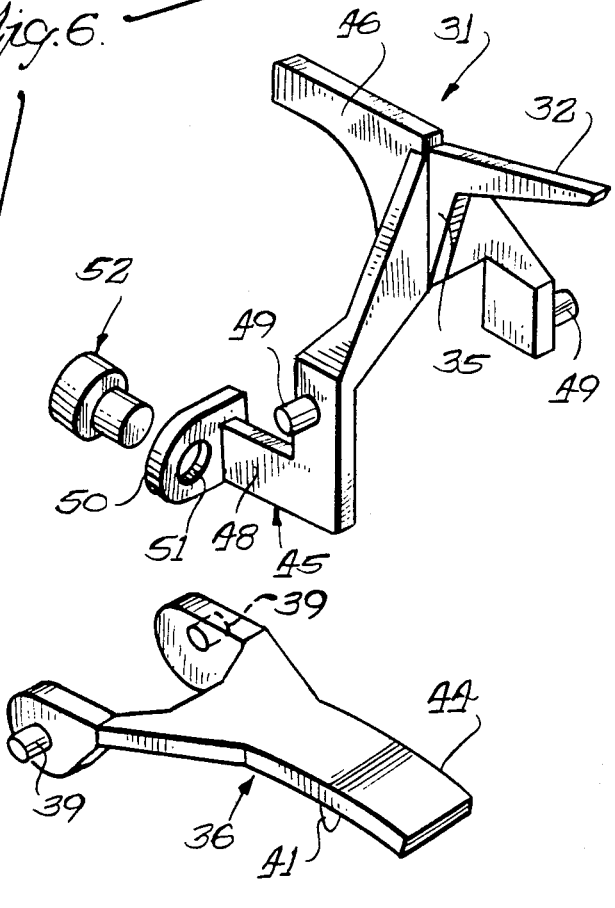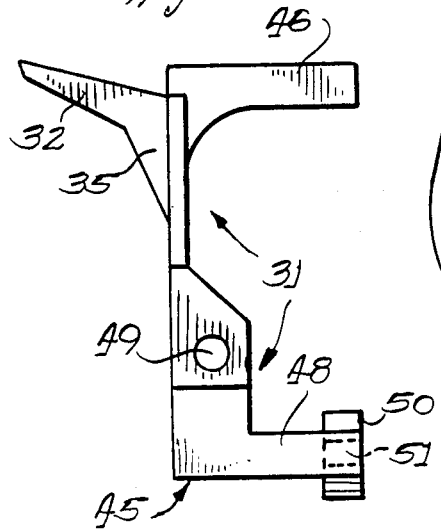

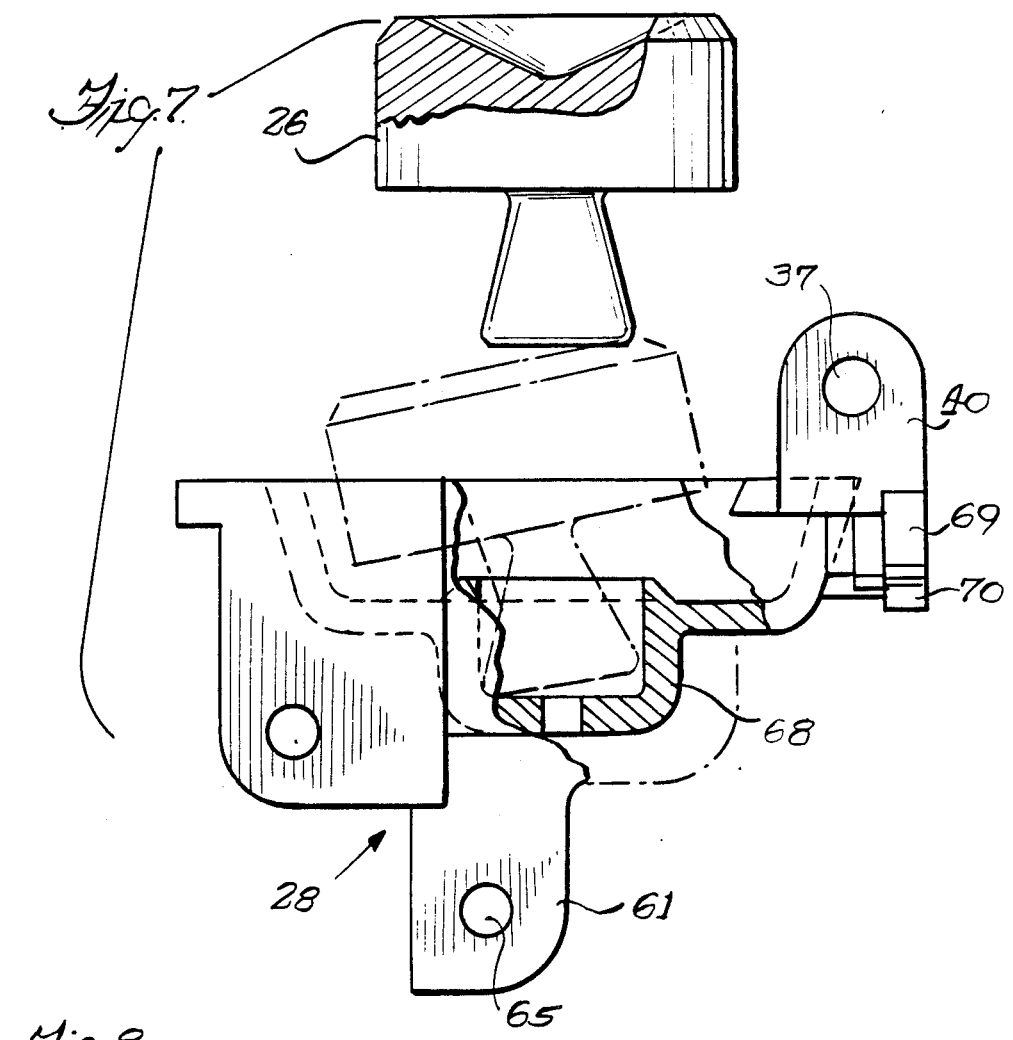
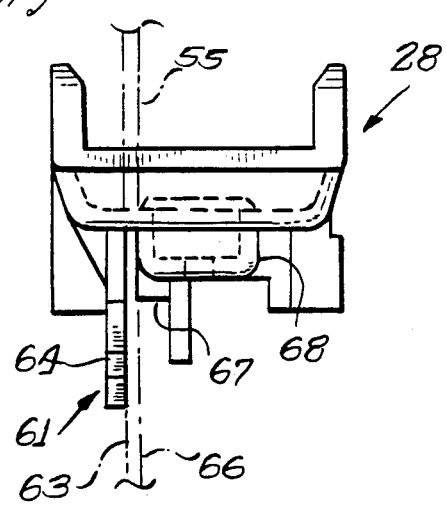
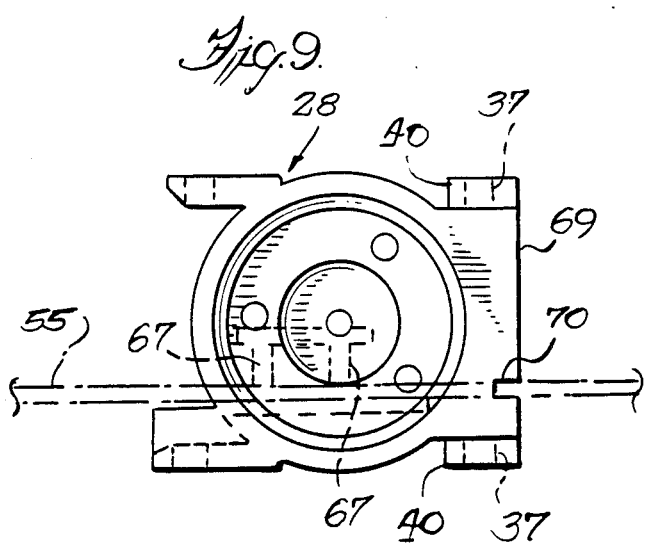

HORIZONTAL RETRACTOR

The present invention relates to a safety belt system and more particularly to a horizontal-mounted retractor system having a programmed pawl and ratchet mechanism for actuating a locking bar to lock ratchet wheels on a spool carrying the seat belt.

In wide-spread use today are seat belt retractors which have a programmed pawl and ratchet mechanism in which the programmed pawl is actuated by an inertia weight to insert the pawl into a programmed ratchet wheel, usually made of light weight plastic, and the turning of the ratchet wheel with the engaged programmed pawl actuates a metal lock bar into locking engagement with the heavy metal ratchet wheels on opposite sides of the reel carrying the wound safety seat belt thereon. Such seat belt retractors have heretofore been mounted in vehicles with the elongated retractor frame mounted substantially vertically in the vehicle, while the lock bar is disposed beneath the ratchet wheels and the inertia weight is below the programmed pawl so that a simple lifting motion results in locking engagement between the locking bar and the reel's ratchet wheels to terminate belt protraction.

Because of constantly changing vehicle designs, there is a need to orient these programmed pawl retractors in various positions other than vertical in a vehicle and, indeed, it is desirable in some instances to mount the retractor horizontally, i.e., with the elongated frame disposed horizontally and with the lock bar mounted in a generally horizontal direction toward or from the reel ratchet wheels. Because the inertia weight provides a vertical upward movement upon displacement, actuating means are needed to convert this vertical displacement into the horizontal actuating movements for the programmed pawl as well as for the ratchet wheel pawls. While it has been generally proposed to use lever mechanisms to translate vertical movement of an inertia weight into other directions of movement of a locking bar, such as shown in U.S. Pat. Nos. 4,498,642; 4,253,622; and 4,245,798, these retractors lack the programmed pawl and ratchet mechanisms and also lack other complexities added to the retractor by such mechanisms. Because these retractors are mass produced in high volumes, not only must the design of such a horizontal retractor be functionally correct, but the design must be readily assembled with low cost parts so that the horizontal retractor will be commercially acceptable and competitive.

Accordingly, a general object of the present invention is to provide a horizontally-mounted safety belt retractor of the programmed pawl kind that reliably operates and can be readily assembled.

This object, and others that will become apparent upon reference to the accompanying drawings and following detailed description, is provided by a horizontally-mounted retractor having a horizontally elongated frame with a horizontal reel rotatably mounted therein adjacent one end. The reel includes a pair of ratchet wheels thereon and carries a rolled safety belt. A locking bar pivotally mounted in the frame is movable along a generally horizontal path of movement into engagement with the rachet wheels on the reel to stop protraction of the belt from the reel. An inertia member mounted in the frame adjacent the end of the frame is movable, due to inertia forces, to move a portion of the member vertically. A transfer member is pivotally mounted on the frame to engage the inertia member and to be pivoted thereby upon vertical displacement of the inertia member. A programmed pawl, pivotally mounted for movement into and out of engagement with a programmed ratchet mounted on the reel axis, includes a first portion that is engagable with the transfer member for displacement upon the pivotable movement of the transfer member. The programmed pawl is thus pivoted into engagement with the programmed ratchet, which further rotates the programmed pawl about its mounting. A portion of the programmed pawl engages the locking bar to pivot the same into locking engagement with the ratchet wheels.

BRIEF DESCRIPTION OF THE DRAWINGS

FIG. 3 is a side elevation of the retractor of FIG. 1, partially broken away to show detail, in which the reel of the retractor is free to rotate in a direction permitting protraction of the safety belt;

FIG. 4 is an enlarged side elevation of the transfer means forming a part of the inventive retractor;

FIG: 5 is an enlarged side elevation of the programmed pawl forming a part of the inventive retractor;

FIG. 6 is an enlarged, exploded perspective view of the transfer arm and programmed pawl;

FIG. 7 is an enlarged, exploded view of the inertia weight and a cage for holding the weight;

FIG. 8 is an elevational view of the cage connected to a sheet member; and

FIG. 9 is a plan view of the cage secured to the sheet member.

DETAILED DESCRIPTION OF THE PREFERRED EMBODIMENT

Figure 2:
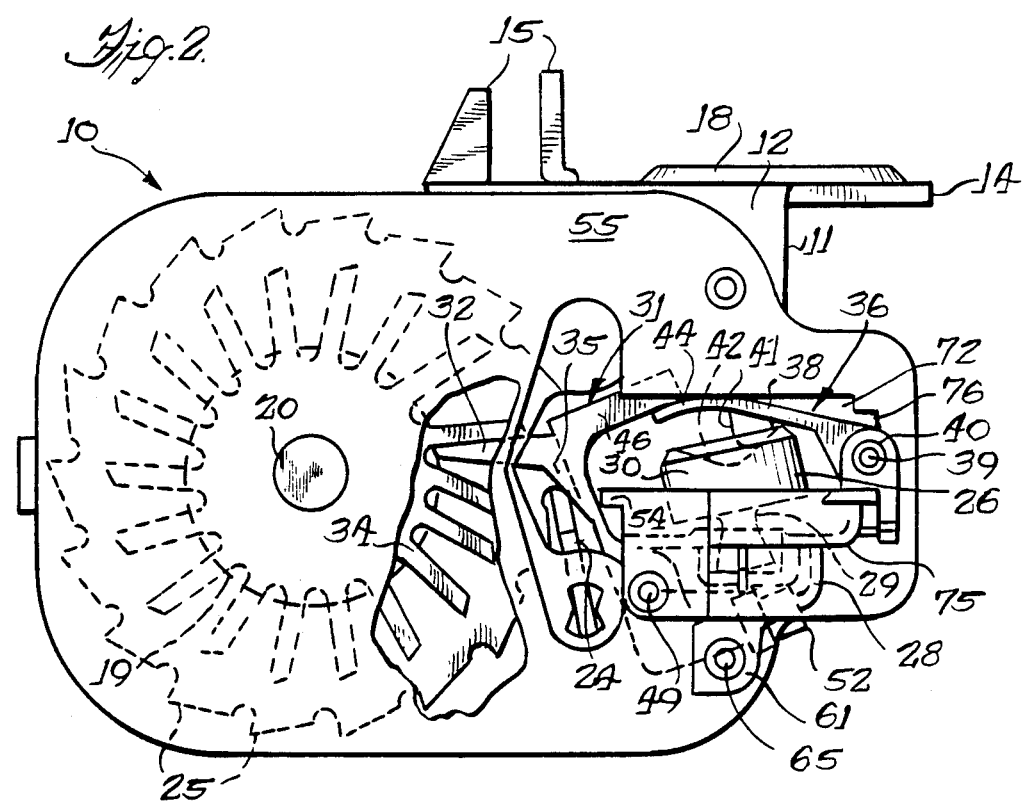
FIG. 2 is a side elevation of the retractor of FIG. 1, partially broken away to show detail, in which the reel of the retractor is locked to prevent further protraction of the safety belt.

As shown in the drawings for purposes of illustration, the invention is embodied in a seat belt retractor, generally indicated by 10, including a horizontally-elongated, U-shaped frame 11 stamped from a heavy gauge metal and having side walls 12 and a connecting cross member 14. For securing the retractor 10 to its associated vehicle (not shown) in a horizontal orientation (as shown in FIGS. 2 and 3), the connecting cross member 14 of the frame 11 includes mounting lugs 15 and an aperture 16 in a raised portion 18 of the cross member 14 which may receive a threaded fastener.

The retractor 10 includes a cylindrical safety belt storage spool 19 mounted concentrically for rotation with a horizontal spool shaft 20 journaled within the side walls 12 of the frame 11. The end of a belt webbing (not shown) is secured to the spool shaft 20 interior of the spool 19, with spirally wound spring means (also not shown) typically associated with the shaft 20 and biased to rotate the storage spool 19 and shaft 20 in a direction (counterclockwise for the illustrated retractor) to cause a retraction or winding of the webbing upon the spool 19.

Fastened to the spool 19 and shaft 20 are ratchet wheels 22 mounted on the ends of the spool 19 and shaft 20 interior of the side walls 12 of the frame 11. A locking bar or pawl 24 is pivotally mounted between the side walls 12 of the frame 11 so as to be pivotally movable into a position in which the locking bar 14 moves along a generally horizontal path to engage the inclined teeth 25 of the ratchet wheels 22 to stop or arrest rotation of the spool 19 and shaft 20 in a direction (clockwise for the illustrated retractor) that permits protraction or unwinding of the safety belt webbing from the spool 19. Such a locking of the spool 19 by the locking bar 24 is desired to occur only when the vehicle is under emergency conditions, such as a sudden stop or collision, when the passengers in the vehicle would be subjected to high acceleration forces, such locking preventing further protraction of the safety belt webbing to securely hold the passenger in place. However, under normal conditions, it is desirable that the spool be free to rotate in an unwinding direction against the force of the retraction spring to accommodate the relatively slow and deliberate movements that the passenger may make for reasons of, e.g., comfort.

An inertia-sensing device is employed to pivot the locking bar 24 into engagement with the ratchet teeth 25 only upon sensing a sudden change in vehicle velocity. In the illustrated mechanism, the inertia-sensing device includes a "wobble" weight 26 which is supported within a cage 28 secured to one of the side walls 12 of the retractor frame 11. The wobble weight 26 includes a relatively small base or stem portion 29 that supports a more massive head or upper portion 30. The weight 26 being thus configured has a high center of gravity and is consequently unstable and readily susceptible to tipping about its base 29 in response to undue forces exerted thereon by, e.g., the deceleration or acceleration of its associated vehicle. Upon tipping, a portion of the uppermost surface of the weight 26 moves vertically to actuate a programmed pawl or pick, generally designated by 31, pivotally mounted to one of the side walls 12 of the retractor frame 11. Upon actuation, the tooth 32 of the pawl 31 is pivoted along a generally horizontal path of movement into engagement with the teeth of a programmed ratchet wheel 34 mounted coaxially with the spool shaft 20 between one of the ratchet wheels 22 and its adjacent side wall 12. Upon such engagement, the programmed ratchet wheel 34 draws the programmed pawl 31 in toward the spool shaft 20, to further pivot the programmed pawl 31 about its mounting. The pawl 31 includes a shoulder portion 35 that, upon pivoting of the pawl 31 in response to engagement with the teeth of the programmed ratchet wheel 34, engages the locking bar 24 to pivot it into engagement with the teeth 25 of the ratchet wheels 22, as illustrated in FIG. 2, to prevent rotation of the spool 19 in an unwinding direction. The positive engagement of the tooth 32 of the pawl 31 with the programmed ratchet wheel 34 ensures that the locking bar 24 is forced into engagement with the teeth 25 of the ratchet wheels 22, and will not be bounced away from engagement by the teeth 25 of the ratchet wheels 22, which may be rotating rapidly in response to a sudden protracting force on the side belt webbing.

In accordance with the present invention, the vertical displacement of inertia weight is translated into horizontal movement of the programmed pawl 31 by an intermediate transfer means, generally indicated by 36, overlying the inertia weight 26 and comprising an arm member 38 pivotally mounted with respect to the side wall 12 of the retractor frame 11. As illustrated, the transfer arm 38 includes pivot pins 39 received in apertures 37 (FIGS. 7 and 9) in mounting ears 40 on the inertia-weight support cage 28. The arm 38 (best seen in FIG. 4) includes a downward-extending finger 41 centered on the middle of its underside. At rest (FIG. 3), the tip of the finger 41 rests in the apex of a conically-shaped recess 42 in the upper surface of the inertia weight 26. However, when the inertia weight 26 tips due to acceleration forces (FIG. 2), the finger 41 rides up the inclined surface of the recess 42 to force the free end 44 of the transfer arm 38 to pivot upwardly about the pins 39. Upon such movement, the free end 44 of the transfer arm 38 engages the programmed pawl 31 to pivot the same into the programmed ratchet wheel 34 to further rotate the programmed pawl about its mounting to abut the locking bar 24 and, consequently, pivot the locking bar 24 into locking engagement with the teeth 25 of the ratchet wheels 22.

In order to ensure that the programmed pawl 31 is not pivoted into the programmed ratchet wheel 34 absent actuation by the inertia weight 26, the programmed pawl 31 includes a counterbalance, generally indicated by 45. As best seen in FIGS. 2, 5 and 6, the programmed pawl 31 includes an arm 46 extending away from the programmed ratchet wheel 34 for engagement with the arm 38 of the transfer means 36. Integral with the programmed pawl 31 is an arm member 48 of the counterbalance 45 which extends in the same direction as the arm 46, but on the opposite side of the pivot pins 49 that secure the programmed pawl to the cage 28. An ear 50 on the end of the arm member 48 includes an aperture 51 for receiving a weight member 52. As illustrated, the weight member 52 has a rivet-shape with the shaft portion 54 of the weight member 52 being received in the aperture 51 (FIG. 6). In practice, it is believed that a weight 52 having a mass of approximately 0.3 grams will provide a sufficient counterbalancing force to prevent pivoting of the programmed pawl 31 in the absence of the inertia weight 26 tipping due to excessive accelerative forces encountered in emergency situations.

In order to maintain the force of the transfer arm 36 on the programmed pawl 31 necessary to pivot the programmed pawl 31 into engagement with programmed ratchet wheel 34, the free end 44 of the transfer arm 38 is curved downwardly (best seen in FIGS. 4 and 6). This ensures that, as programmed pawl 31 pivots in response to upward movement of the transfer arm 36 upon tipping of the inertia weight, the arm 46 of the programmed pawl 31 tangentially contacts the curved surface of the free end 44 of the transfer arm 38, with the resultant force on the arm 46 being perpendicular to the curved surface.

It is desirable to ensure that the locking bar 24 is not pivoted into engagement with the teeth 25 of the ratchet wheel 22 absent engagement of the programmed pawl and the programmed ratchet wheel caused by a full or complete tipping of the inertia weight 26. Accordingly, the retractor 10 is configured so that the programmed pawl 31 may initially pivot a short arc from its resting position before the tooth 32 engages the teeth of the programmed ratchet wheel 34 and the shoulder 35 on the pawl 31 abuts the locking bar 24 to pivot the same into engagement with ratchet teeth 25. To this end, the cage 28 for the inertia weight 26 includes a projecting tab or lip 54, against which the locking bar 24 abuts when in its resting position (FIG. 3). In this position, the locking bar 24 is slightly spaced from the shoulder 35 of the pawl 31 and the latter is in its unactuated position.

Figure 1:
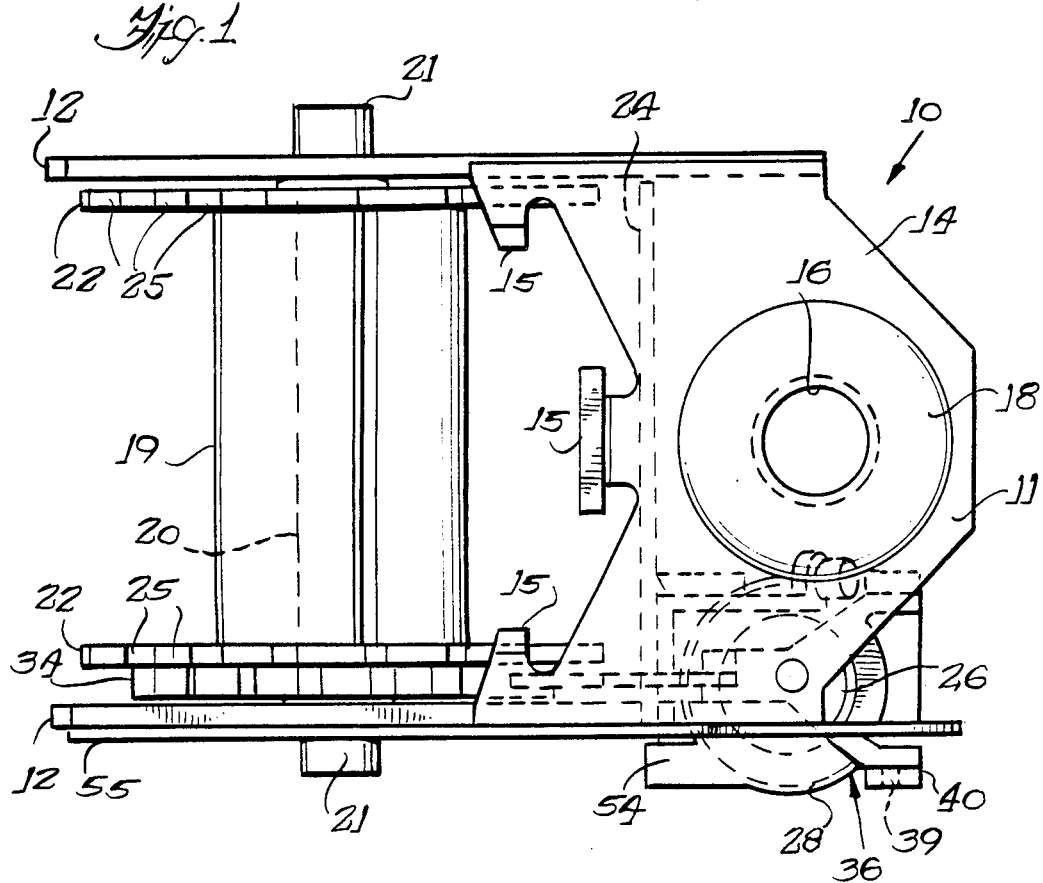
FIG. 1 is a top view of a safety belt retractor embodying the present invention.

In order to facilitate the assembly of the retractor mechanism, the programmed pawl 31, transfer member 38, inertia weight 26 and weight support cage 28 are preassembled into a subassembly which is then secured to a thin, rigid, plastic sheet member 55 (FIGS. 1, 8 and 9) having substantially the same outline as the side walls 12 of the retractor frame 11. The cage 28 is secured to the sheet member 55 by means of an integral depending lug 61 in face-to-face engagement with an outer side 63 of the sheet member which has an integral projection 64 projecting into snap fit engagement with an aperture 65 on the depending lug 61. The sheet member is engaged on its interior facing side 66 by a pair of lugs 67 integrally formed with and beneath basket 68 which supports the lower end of the inertia weight. A rear horizontally extending wall 69 on the cage is formed with a notch 70 which fits into the sheet member 55 to also locate and hold the cage on the sheet member with the cage straddling the sheet member and disposed within the large opening 72 formed in the sheet member. Thus, in assembling the horizontal retractor, the subassembly, including the cage 28 with the transfer member 38 and programmed pawl 31 thereon and with the inertia weight 26 in the basket 68, is moved into the opening 72 to straddle a lower edge 75 of the opening to shift the notch into engagement with rear vertical wall 76 of the opening and with lugs 67 and ear 61 sliding along the sheet member 55. Then, the basket is pushed down to snap the projection 64 on the sheet member into the aperture 65 on the cage to interlock the cage to the sheet member.

Thus it can be seen that a horizontal retractor mechanism can be readily assembled to function reliably in an otherwise high tolerance situation. While the invention has been described in terms of a preferred embodiment, there is no intent to limit the invention to the same. On the contrary, it is intended to cover all modifications and equivalents within the scope of the appended claims.

What is claimed is:

1. In a horizontally mounted retractor, a horizontally elongated frame having a pair of substantially parallel side walls extending horizontally and elongated in the horizontal direction, a reel rotatably mounted in the frame side walls adjacent a first end thereof having a pair of ratchet wheels thereon and carrying a rolled safety belt,
    a locking bar pivotally mounted in the frame side walls for generally horizontal travel into engagement with the ratchet wheels on the reel to stop protraction of the belt from the reel,
    one of said side walls having an opening therein located horizontally adjacent one of said ratchet wheels,
    an inertia member mounted in the frame and projecting into said opening in said one of said frame side walls, and movable with inertia forces to move a portion of the inertia member vertically,
    a transfer means pivotally mounted on the frame to engage the inertia member and to be pivoted by vertical displacement of the inertia member as it pivots with a portion thereof pivoting in said opening of said one of said frame side walls,
    a programmed ratchet mounted for rotation about the reel axis,
    a programmed pawl pivotally mounted for movement into and out of engagement with the programmed ratchet, a first portion on the programmed pawl engageable with the transfer means for displacement with pivotable movement of the transfer means to pivot the programmed pawl into engagement with the programmed ratchet whereby the programmed ratchet further rotates the programmed pawl about its mounting, and
    means on the programmed pawl for pivoting the locking bar for generally horizontal travel into locking engagement with the ratchet wheels when displaced by the programmed ratchet.

2. Retractor in accordance with claim 1 in which said transfer means comprises a transfer arm pivoted at one end remote from the programmed ratchet and having a free end on the opposite side of the inertia member in engagement with the programmed pawl.

3. A retractor in accordance with claim 2 in which the programmed pawl includes an arm extending away from the programmed ratchet and into engagement with the free end of the transfer arm and to be pivoted by displacement of the transfer arm.

4. A retractor in accordance with claim 3 in which the programmed pawl includes a shoulder that abuts an upper portion of the locking bar for swinging the locking bar into locking engagement with the ratchet wheels.

5. A retractor in accordance with claim 3 in which the programmed pawl includes a counterbalance that ensures that the arm of the programmed pawl continually engages the free end of the transfer arm.

6. In a horizontally mounted retractor, a horizontally elongated frame having a pair of substantially parallel side walls extending horizontally and elongated in the horizontal direction, a first one of said side walls having an enlarged opening therein, a reel rotatably mounted in the frame side walls adjacent a first end thereof having a pair of ratchet wheels thereon and carrying a rolled safety belt,
    a locking bar pivotally mounted in the frame side walls for generally horizontal travel into engagement with the ratchet wheels on the reel to stop protraction of the belt from the reel,
    a programmed ratchet mounted on the reel and rotatable therewith, and
    a subassembly for mounting in the frame and for actuating the lock bar for horizontal travel, said subassembly including a cage means having a vertically movable inertia weight, said subassembly being mounted in said enlarged opening of said side wall with portions of said cage means extending inwardly and outwardly of said first side wall, a transfer means mounted on the cage means for transferring the vertical movement of the inertia weight, a programmed pawl pivotally mounted on the cage means and movable by the transfer means to engage the program ratchet which in turn pivots the programmed pawl to actuate the locking bar into locking engagement with said pair of ratchet wheels to stop belt protraction.

7. A retractor in accordance with claim 6, in which said transfer means comprises a pivoted transfer lever pivotally mounted on said cage means and having an actuating portion engaging the programmed pawl.

8. In a horizontally mounted retractor, a horizontally elongated frame, a reel rotatably mounted in the frame adjacent a first end thereof having a pair of ratchet wheels thereon and carrying a rolled safety belt,
    a locking bar pivotally mounted in the frame for generally horizontal travel into engagement with the ratchet wheels on the reel to stop protraction of the belt from the reel, an inertia member mounted in the frame adjacent an end opposite the first end of the frame and movable with inertia forces to move a portion of the inertia member vertically, a transfer means pivotally mounted on the frame to engage the inertia member and to be pivoted by vertical displacement of the inertia member, a programmed ratchet mounted for rotation about the reel axis, a programmed pawl pivotally mounted for movement into and out of engagement with the programmed ratchet, a first portion of the programmed pawl engageable with the transfer means for displacement with pivotable movement of the transfer means to pivot the programmed pawl into engagement with the programmed ratchet whereby the programmed ratchet further rotates the programmed pawl about its mounting, means on the programmed pawl for pivoting the locking bar for generally horizontal travel into locking engagement with the ratchet wheels when displaced by the programmed ratchet, said transfer means comprising a transfer arm pivoted at one end remote from the programmed ratchet and having a free end on the opposite side of the inertia member in engagement with the programmed pawl, the programmed pawl including an arm extending away from the programmed ratchet and into engagement with the free end of the transfer arm and to be pivoted by displacement of transfer arm, the programmed pawl including a shoulder for abutting an upper portion of the locking bar for swinging the locking bar into locking engagement with the ratchet wheels, the free end of the transfer arm being curved so that as both the transfer arm and programmed pawl pivot in response to vertical displacement of the inertia member, the arm of the programmed pawl is in continuous tangential engagement with the curved surface of the transfer arm.

9. In a horizontally mounted retractor, a horizontally elongated frame, a reel rotatably mounted in the frame adjacent a first end thereof having a pair of ratchet wheels thereon and carrying a rolled safety belt, a locking bar pivotally mounted in the frame for generally horizontal travel into engagement with the ratchet wheels on the reel to stop protraction of the belt from the reel, a programmed ratchet mounted on the reel and rotatable therewith, and a subassembly for mounting in the frame and for actuating the lock bar for horizontal travel, said subassembly including a cage means having a vertically movable inertia weight, a transfer means mounted on the cage means for transferring the vertical movement of the inertia weight, a programmed pawl pivotally mounted on the cage means and movable by the transfer means to engage the program ratchet which in turn pivots the programmed pawl to actuate the locking bar into locking engagement with said pair of ratchet wheels to stop belt protraction, said transfer means comprising a pivoted transfer lever pivotally mounted on said cage means and having an actuating portion engaging the programmed pawl, and a plastic sheet member secured to said frame and having an opening therein and means on said subassembly and said sheet member having a snap fitted interlocking relationship to mount said subassembly onto said sheet member.

* * * * *

UNITED STATES PATENT AND TRADEMARK OFFICE
CERTIFICATE OF CORRECTION

PATENT NO. : 4,705,230
DATED : November 10, 1987
INVENTOR(S) : Gerald A. Doty

It is certified that error appears in the above-identified patent and that said Letters Patent is hereby corrected as shown below:

Column 5, Line 63, change "." to --,--.

Signed and Sealed this

Twenty-ninth Day of March, 1988

Attest:

DONALD J. QUIGG

Attesting Officer    Commissioner of Patents and Trademarks